United States Patent [19]

Risler et al.

[11] 4,060,645

[45] Nov. 29, 1977

[54] DEHYDRATED FOOD PRODUCT

[75] Inventors: Pierre Risler, Montmorency; Jean Gireau, Montrouge; Pierre Rosé Ennery; Jean-Pierre Bisson, Boulogne-Billancourt, all of France

[73] Assignee: Societe d'Assistance Technique pour Produits Nestle S.A., Lausanne, Switzerland

[21] Appl. No.: 634,519

[22] Filed: Nov. 24, 1975

[30] Foreign Application Priority Data

Dec. 17, 1974 France .................. 74.41603

[51] Int. Cl.² .............. A23L 1/40; A23L 1/226
[52] U.S. Cl. .............. 426/302; 426/589; 426/650; 426/445; 426/99
[58] Field of Search .............. 426/589, 650, 307, 559, 426/450, 445, 446, 447, 448, 449, 302

[56] References Cited

U.S. PATENT DOCUMENTS

| | | | |
|---|---|---|---|
| 1,924,826 | 8/1933 | Anderson | 426/559 |
| 2,858,226 | 10/1958 | Kaufman | 426/445 |
| 2,954,296 | 9/1960 | Clausi et al. | 426/559 |
| 3,057,739 | 10/1962 | Forkner | 426/445 |
| 3,325,295 | 6/1967 | Vande Ven | 426/445 |
| 3,637,397 | 1/1972 | Menzies et al. | 426/446 |
| 3,650,769 | 3/1972 | Fritzberg | 426/589 |
| 3,753,729 | 8/1973 | Harms et al. | 426/559 |
| 3,779,772 | 12/1973 | Forkner | 426/559 |

*Primary Examiner*—Jeanette M. Hunter
*Attorney, Agent, or Firm*—Watson, Leavenworth, Kelton & Taggart

[57] ABSTRACT

A dehydrated food product in the form of grains which dissolve instantly in water and which have a porous, continuous structure, a smooth surface and an apparent density of from 30 to 600 g/l the product is prepared by extruding a thermoplastic starting material in powder or paste form into a chamber where a sub-atmospheric pressure prevails, and cutting the extruded product into fragments.

12 Claims, 2 Drawing Figures

DEHYDRATED FOOD PRODUCT

This invention relates to dehydrated food products, more especially bouillons, seasonings, aromatics, condiments and sauces, products based on extracts of meat, protein hydrolysates, vegetables, fruits, spices, products of the aroma carrier type, etc., and also to a process for producing these products.

Dehydrated food products, more especially dehydrated soups, generally have the serious disadvantage of being difficult to dissolve, even in hot water, so that particular precautions have to be taken to prevent the formation of clumps in the reconstituted product.

An object of the present invention is to provide a new industrial product of the dehydrated food product type in the form of grains. The new product is distinguished in particular by the fact that it is in the form of grains which dissolve instantly in water and which have a porous, continuous structure, a smooth surface and an apparent density of from 30 to 600 g/l.

The invention also relates to a process for producing such a product which comprises extruding a thermoplastic starting material in powder or paste form into a chamber where a sub-atmospheric pressure prevails, and cutting the extruded product into fragments.

The dehydrated food products with which the invention is concerned are essentially stocks, soups, consommes, soup bases, etc., seasonings, condiments and sauces, dehydrated products based on extracts of meat, vegetables, fruits, spices, products of the aroma carrier type, etc.

The accompanying drawing shows one exemplary embodiment of the product according to the invention.

The grains according to the invention have the property of dissolving almost instantaneously in water. They dissolve instantaneously in hot water. Unexpectedly, they dissolve substantially immediately in cold water in the absence of impregnation or coating fats.

Figure 1:
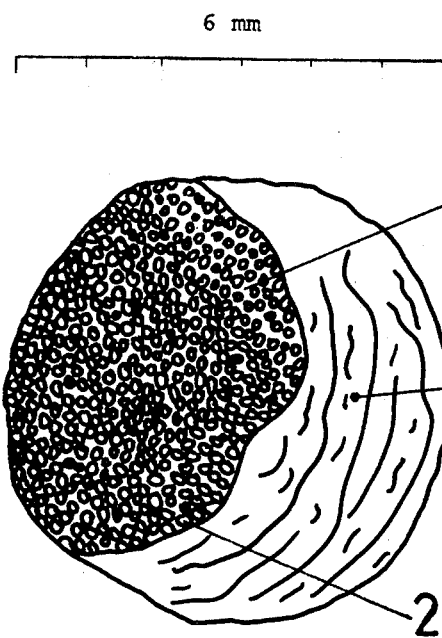
FIG. 1 is a diagrammatic section through a grain according to the invention 6 mm in diameter enlarged 12.8 times.

As shown in the drawing (FIG. 1), the grains according to the invention have a porous, cellular internal structure 1. This structure is fairly regular and may be compared with a structure of the sponge type. The average size of the cells 2 is variable within wide limits depending upon the production conditions, normally amounting to between a few 1/100 mm and 1 mm. By virtue of their generally homogeneous structure, coupled with the absence of any significant irregularity other than accidental, the grains according to the invention differ radically from the granules obtained by the agglomeration of finer particles.

The external appearance of the grains according to the invention differs from their internal appearance. They have a surface 3 which, accidents apart, is relatively smooth without any roughness, the pitting effect attributable to the open cells around the outside of the grains being limited in the extreme. In other words, the grains have a skin in the form of a very thin, fine porous film.

In short, the appearance of these grains bears a striking resemblance to that of pumice stone.

The apparent density of the grains, amounting to between 30 and 600 g/l, invites little comment. It is a direct consequence of the porous, cellular structure and may be predetermined by carefully selecting the production conditions.

The shape and size of the grains may also be predetermined in dependence upon the production conditions. In practice, the minimal dimensions in which the grains can be produced without any major difficulties are of the order of 1 to 1.5 mm, in other words the grains are retained by a 1 mm mesh screen (U.S. Standard No. 18). The grains are preferably produced in sizes of from 2.5 to 15 mm.

Figure 2:
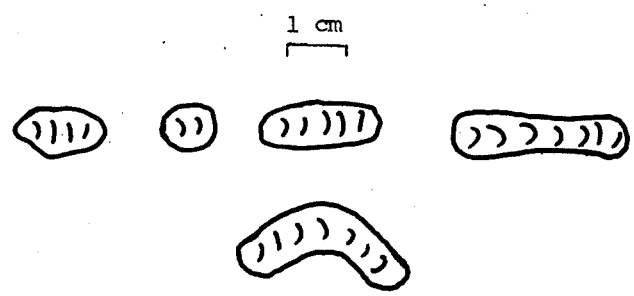
FIG. 2 illustrates grains according to the invention.

The grains obtained by a process where only a single nozzle (or several identical nozzles or even a multiple nozzle with identical orifices) is used and where the extruded product is cut in a regular sequence, are all substantially identical in shape and size without any oversize or undersize grains. A few possible grain forms are illustrated by way of example in FIG. 2. By simultaneously using several different nozzles or by selecting an irregular cutting sequence, it is of course readily possible to obtain an end product consisting of grains differing from one another in shape and size. This result may also be obtained by mixing the end product from a first production cycle with the end product of another production cycle.

In general, the grains are relatively hard and show good resistance to crushing. For example, a whole grain of instant stock, generally spherical in shape with a diameter of 6 mm, has a resistance to crushing of the order of 2.5 to 20 Newtons.

The grain-form dehydrated food products according to the invention, of which the water content may amount to as much as 10% of their dry weight, additionally have a very high absorption capacity. Thus, "lean" grains, i.e. grains containing little or no fats, are capable of absorbing up to 25% of their weight of fats, aromas, colorants, etc. However, they are substantially non-hygroscopic insofar as they can be exposed for several days to atmospheric humidity without becoming tacky.

In one process for producing these grains, a thermoplastic starting material in powder or paste form is extruded into a chamber in which a sub-atmospheric pressure prevails.

In the context of the invention, the "thermoplastic starting material" is a powder-form or paste-form material which is either thermoplastic in itself or which contains enough thermoplastic constituents to be capable of softening under the effect of heat, and optionally pressure and of hardening when cooled. The notion of thermoplasticity is easily realised in the case of a paste. In the case of a powder, this notion signifies that the constituent particles of the powder are capable, under the effect of heat, and optionally pressure, of melting into one another to form a soft, more or less malleable mass.

This starting material may be selected from a wide range of food-grade materials used individually or in combination which, more specifically, may be grouped into two categories: materials based on polysaccharides and the like and materials based on proteins. One or the other of these two categories covers, for example, extracts of fruits, vegetables, seeds, starches, more especially modified starches and dextrins, gums, alginates, meat and fish extracts, proteins of microbiological origin, especially yeast extracts and autolysates, protein hydrolysates, gelatins, etc. The starting material may also contain other ingredients such as spices, aromas, colorants, fats, sugars, salts, etc., the whole having to remain thermoplastic.

In general, preferred starting materials are low-fat or fat-free starting materials, for example extracts of fruits and vegetables, dextrins, gums, low-fat or fat-free instant stocks in powder or flake form or mixtures for preparing such stocks, mixtures which normally contain, aside from vegetable extracts, yeast autolysates, meat extracts, protein hydrolysates, flavourings, spices, sugar, salt, glutamate, and the like.

The water content of the starting material (in the form of a powder or paste) is an important factor, but is not critical insofar as it may vary within a wide range, amounting to as much as 20%, based on the dry weight of the grain. It has a direct influence upon the characteristics of the end product and, to prepare a given end product, it may be necessary to modify the water content of the starting material.

The temperature of the starting material in the extruder is obviously an essential factor of the process according to the invention because it is this temperature which ensures the plasticity of the starting material and enables it to pass suitably through the extrusion nozzles. It should be high enough to ensure this plasticity, namely of the order of 60° C, but should not cause any deterioration of the treated extract. A temperature of 125° C may be regarded as an upper limit which it is best not to exceed. However, it is pointed out that the temperature in the vicinity of the nozzles may be above that limit because the residence time of the starting material there is very short. In the absence of particular precautions, this temperature is effectively above the temperature prevailing in the actual extruder. This is because the compression forces which act on the starting material, at least when it has to pass through the small orifices constituting the nozzles, cause an increase in temperature and the establishment upstream thereof of a pressure normally amounting to between 1 and 15 bars (approximately 1 to 15 atmospheres) in regular operation. Nevertheless, it is preferred to avoid excessive heating in the vicinity of the nozzles.

The diameter of these small orifices, which partly determines the pressure level in the extruder, may be selected with a considerable degree of freedom in dependence upon the dimensions which the end product is intended to have. However, extrusion is difficult to carry out in a practical manner if the orifices have dimensions of less than 25/100 mm. Nozzle diameters of the order of 0.5 to 5 mm may be considered as optimum values for the production of dehydrated food products in grain form from a starting material in powder form with a water content of from 1.5 to 10%. The shape of the nozzles is of minor importance insofar as the results obtained with short or long nozzles, conical nozzles or even two-pices nozzles (the one narrow, the other wider) are not significantly better than those obtained with conventional cylindrical nozzles. In order to provide the end product with a particular shape, it is of course possible to use nozzles of non-circular cross-section, for example nozzles of square, oval or even cloverleaf cross-section, etc. In addition, the surface finish of the extruded product, i.e. of the grains obtained, may be influenced by using refrigerated or gently heated nozzles or nozzles of which the outer part is refrigerated or gently heated.

On the other hand, the sub-atmospheric pressure or vacuum prevailing in the chamber downstream of the nozzles is a critical factor. In the absence of this vacuum, the product obtained by extruding a starting material heated to fairly moderate temperatures for operations of this kind would not be able to acquire the expanded texture required. By contrast, the presence of the vacuum downstream of the nozzles causes, on the one hand, a sudden elimination of at least part of the water in the form of steam and of the gases initially present in the extract and, on the other hand and correlatively, a sudden reduction in temperature, leaving the extruded product with the required texture and rigidity. In practice, the sub-atmospheric pressure is of the order of 0.01 to 0.3 bar (approximately 0.01 to 0.3 atmosphere) essentially for reasons of technology and cost.

In one embodiment of the process according to the invention, the starting material in powder or paste form is introduced by delivery means of any kind, at atmospheric pressure, under pressure or in vacuo and, if necessary, under an inert gas into an extruder of which the barrell is at a temperature of from 60° to 100° C. This extract is then conveyed towards the extrusion nozzle (s) by such means as a piston (batch operation) or a single or double screw (continuous operation), with a fixed or variable pitch and optionally heated, and gradually plasticises under the effect of the heat and pressure applied. The hot material then passes through the extrusion nozzles and arrives in the chamber where the vacuum prevails, which may also be referred to as an expansion chamber. Under the effect of the sudden decompression, part of the water (up to 50%) and of the gases present in this hot extract is expelled whilst the temperature of the hot extract falls by several tens of degrees. An expanded product in the form of a porous, relatively rigid strand is thus obtained.

In a first variant, the strand is left to expand completely and is then cut in a regular sequence, for example by means of a rotary blade. The grains obtained with uniform dimensions resemble pellets or "slices" in appearance.

In a second, preferred variant, the strand is cut before having completed its expansion, i.e. very close to the extrusion nozzles and in vacuo. The pellets obtained continue to expand, ultimately giving spheroidal or ovoidal grains of comparable size.

In a third variant, the pellets obtained by cutting the strand as it issues from the nozzles are collected in individual moulds in which they expand, thus assuming the shape of the mould.

As already mentioned, application of the vacuum enables the starting material to be textured without any need to heat it to a high temperature. As a result, the delicate substances present in this material, especially the aromatic substances, are largely preserved. Accordingly, the grains obtained have remarkable flavour and aroma qualities. In addition, by virtue of their porous structure, they are able to absorb large quantities of various substances, for example fats, aromas, etc. Accordingly, it is possible if desired to spray onto these grains fats and aromatic substances diluted if desired in a suitable vehicle. They may of course also be after-treated, for example after-dried.

In one preferred embodiment of the process according to the invention, the starting material used for extrusion has a low or zero fat content and is in paste or powder form with any granulometry and with a water content of from 1.5 to 10%. The extruder used is a heated screw extruder kept at 80° to 100° C and equipped with nozzles from 0.5 to 5 mm in diameter. The pressure in the expansion chamber is of the order of 0.05 to 0.15 bar (approximately 0.05 to 0.15 atmosphere). The expanded strand is cut in vacuo immediately it issues from the extrusion nozzles. The grains obtained then drop onto a tray and, having completed their expansion, may be carried outside the expansion chamber through an air-lock. These grains generally have an apparent density of from 50 to 500 g/l and may be consumed as such, constituting for example instant fruit and vegetable extracts, instant stocks, etc. They may also be treated with various substances. In particular, they may be impregnated or coated with fats, preferably in a quantity of from 8 to 18% by weight, to form instant fat stocks in grain form whose dissolution in hot water does not involve any particular precautions. In the case of grains prepared from dextrin it is possible to add aromas, especially plant aromas (flowers, spices, coffee, tea, herbal decoctions, etc). colorants, alcohol, constituting for example bases for instant aperitifs with or without alcohol which dissolve immediately in cold water.

EXAMPLES

Equipment used:
1 feed hopper (BUSS RT 46) with a capacity of 10 liters.
1 extruder (BUSS ASV 46) with a theoretical output of 20 kg/h having a steam-heatable barrel and a fixed-pitch screw 42 mm in diameter and 21 cm long with a compression ratio equal to 1.
1 expansion chamber with a capacity of 80 liters equipped with 1 liquid ring pump (SIHI).
1 condenser
1 rotary blade
1 refrigerable, vibrating tray
1 discharge air-lock
This equipment was used in all the folowing examples.

EXAMPLE 1

380 kg of a powder-form starting material of the following composition with a water content of 4% are extruded using the equipment described above, the extruder being equipped with 4 cylindrical extrusion nozzles 3.5 mm in diameter:

| | |
|---|---|
| dried yeast extract | 60 kg |
| dried protein hydrolysate | 60 kg |
| sugar | 20 kg |
| salt | 160 kg |
| ground garlic | 0.8 kg |
| celery on salt support | 0.4 kg |
| clove on salt support | 0.1 kg |
| bay on salt support | 0.1 kg |
| pepper on salt support | 0.5 kg |
| thyme on salt support | 0.1 kg |
| monosodium glutamate | 68 kg |
| dried onion concentrate | 10 kg |
| | 380 kg |

The operating parameters are as follows:
temperature of extruder barrel: 100° C
screw speed: 45 rpm
rotational speed of cutting blade: 840 rpm
pressure in the extrusion chamber: 80 mb
the grains are collected on a vibrating tray refrigerated with liquid nitrogen before operation.

Approximately 375 kg of instant stock grains resembling chick peas and having an apparent density of 310 g/l are thus obtained. These grains dissolve instantaneously in cold water. A stock is prepared by dissolving these grains in hot water in a quantity of 20 g/l, its quality comparing advantageously with that of corresponding commercially available stocks.

EXAMPLE 2

The grains of instant stock of Example 1 which issue from the expansion chamber at a temperature of from 65° to 80° C are transferred to a coating machine. Solid beef fat kept at a temperature of approximately 60° C is then sprayed onto the grains in a quantity equivalent to an impregnation level of 17%.

A stock is prepared by dissolving these grains containing 17% of fat in hot water in a quantity of 20 g/l, its quality comparing advantageously with that of corresponding commercially available fat containing stocks.

EXAMPLE 3

380 kg of a powder-form starting material of the following composition with a water content of approximately 4.5% are extruded using the equipment described above, the extruder being equipped with a single nozzle having 4 cylindrical orifices 3.5 mm in diameter:

| | |
|---|---|
| dried yeast extract | 60 kg |
| malto-dextrine MD 05 | 60 kg |
| sugar | 20 kg |
| salt | 160 kg |
| celery on salt support | 0.5 kg |
| pepper on salt support | 0.5 kg |
| monosodium glutamate | 68 kg |
| concentrated chicken extract | 11 kg |
| | 380 kg |

The operating parameters are as follows:
temperature of extruder barrell 100° C
screw speed: 45 rpm
rotational speed of cutting blade: 840 rpm
pressure in the extrusion chamber 80 mb
the grains are collected on a vibrating tray at room temperature 375 kg of instant chicken stock grains resembling chick peas and having an apparent density of approximately 100 g/l are thus obtained. A chicken stock is prepared by dissolving these grains in hot water in a quantity of 25 g/l.

EXAMPLE 4

Following the procedure of Example 2, 15% of solid chicken fat are incorporated into the grains of instant chicken stock of Example 3. Grains impregnated with fats are obtained in this way. Dissolution of these grains in hot water in a quantity of 25 g/l gives a chicken stock.

EXAMPLE 5

10 kg of malto-dextrin MD 05 (supplier: Roquettes Freres) with a water content of 4.5% are extruded using the equipment described above, the extruder being equipped with a nozzle having 4 cylindrical orifices 3 mm in diameter.

The operating parameters are as follows:
temperature of extruder barrel: 120° C
screw speed: 30 rpm
rotary speed of cutting blade: 370 rpm
pressure in the expansion chamber: 50 mb
the grains are collected on a vibrating tray at room temperature Approximately 9.8 kg of malto-dextrin grains are obtained in this way. These malto-dextrin grains dissolve instantly in cold water and have the size of a small pea and an apparent density of approximately 60 g/l.

An oleoresin of pepper is sprayed onto these grains in a quantity of 10%. The resulting grains, which may be used as a flavouring, have better keeping quality than a corresponding flavouring on salt or on glucose support. This grains-form flavouring on maltodextrin may be used in compositions for stocks.

In addition, it is possible to spray the same base grains with various essences, such as ginger, bitter orange, etc., to obtain bases for an instant aperitif.

EXAMPLE 6

80 kg of raspberry juice are prepared by pressing 100 kg of raspberries, after which the juice is deodorised by stripping with steam, the stripped aromatic values being recovered and concentrated. The deodorised juice is concentrated to approximately 50% of dry matter and then spray dried to a residual moisture content of 5%. 14 kg of a red coloured powder are thus obtained, which are transferred to the equipment described above, the extruder being equipped with a nozzle having 5 cylindrical orifices 3 mm in diameter.

The operating parameters are as follows:
temperature of the extruder barrell: 120° C
screw speed: 30 rpm
rotational speed of cutting blade: 370 rpm
pressure in the expansion chamber: 50 mb
the grains are collected on a vibrating tray at room temperature Approximately 13.7 kg of grains are thus obtained and are aromatised by spraying with the concentrated aromatic values recovered at the beginning of the operation during the stripping with steam. Grains of instant raspberry juice are thus obtained and, by dissolution in cold water in a quantity of 100 g/l, give a refreshing raspberry drink.

EXAMPLE 7

The procedure of Example 5 is repeated using, as starting material, a mixture of 14 kg of the raspberry powder of that example and 3.5 kg of malto-dextrin MD 05. 17.1 kg of grains are obtained after extrusion, which are aromatised in the same way as described above. Grains of instant raspberry juice are thus obtained and, by dissolution in cold carbonated water in a quantity of 90 g/l, give a sparkling raspberry drink.

We claim:

1. A process for the production of a dehydrated food product selected from the group consisting of stocks, soups, consummes, soup bases, seasonings, condiments, sauces, extracts of meat, vegatable, fruit and spice supports based on dextrin which comprises extruding at a temperature in the range from 60° to 125° C. and under a pressure of from 1 to 15 bars a thermoplastic starting material selected from the group consisting essentially of edible powder and paste and containing up to 20% water into a chamber where a sub-atmospheric pressure from 0.01 to 0.3 bar prevails, and cutting the extruded product into fragments.

2. A process as claimed in claim 1, wherein the starting material is a food-grade material and comprises one or more of extracts of fruits, vegetables and seeds, starches, especially modified starches and dextrins, gums, alginates, meat and fish extracts, proteins of microbiological origin, especially extracts and autolysates of yeast, protein hydrolysates and gelatins.

3. A process as claimed in claim 1, wherein the starting material is a thermoplastic material containing spices, aromas, colorants, fats, sugars or salts.

4. A process as claimed in claim 1, wherein the thermoplastic starting material in powder or paste form contains from 1.5 to 10% of water.

5. A process as claimed in claim 1, wherein the starting material is extruded through at least one nozzle with a diameter of at least 25/100 mm.

6. A process as claimed in claim 1, wherein the starting material is extruded into a chamber where a sub-atmospheric pressure of from 0.05 to 0.15 bar prevails.

7. A process as claimed in claim 1, wherein the extruded product is cut before its expansion.

8. A process as claimed in claim 1, wherein the extruded product is cut after its expansion.

9. A process as claim in claim 7, wherein the extruded product cut into fragments is impregnated or coated with a fat.

10. A process as claimed in claim 8, wherein the extruded product cut into fragments is impregnated or coated with a fat.

11. A process as claimed in claim 7, wherein the extruded product cut into fragments is aromatised.

12. A process as claimed in claim 8, wherein the extruded product cut into fragments is aromatised.

* * * * *